W. G. WILSON.
MEANS FOR SECURING HUBS TO SHAFTS.
APPLICATION FILED MAR. 9, 1916. RENEWED NOV. 10, 1921.
1,402,463.
Patented Jan. 3, 1922.
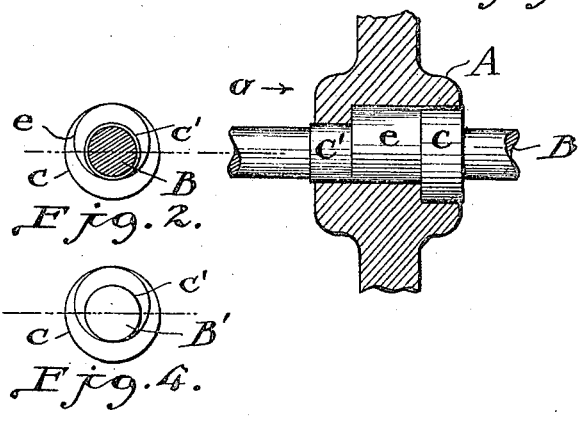
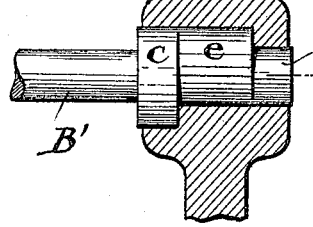
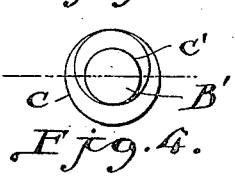
WITNESSES:
INVENTOR
Wylie G. Wilson.
BY
his Attorneys

UNITED STATES PATENT OFFICE.

WYLIE GEMMEL WILSON, OF NEW YORK, N. Y.

MEANS FOR SECURING HUBS TO SHAFTS.

1,402,463. Specification of Letters Patent. Patented Jan. 3, 1922.

Application filed March 9, 1916, Serial No. 82,998. Renewed November 10, 1921. Serial No. 514,369.

*To all whom it may concern:*

Be it known that I, WYLIE GEMMEL WILSON, a subject of the King of Great Britain, and resident of New York City, in the county of New York and State of New York, have invented certain new and useful Improvements in Means for Securing Hubs to Shafts, of which the following is a specification.

This invention is a means for securing hubs to shafts, and is particularly adapted for fastening fly-wheels to engine shafts.

It is the customary practice to fasten fly-wheels to engine shafts by means of feathers, wedges, and analogous expedients. These devices, however, as is well understood, are open to serious objections, such as the difficulties of accurate installation, and their tendency to work loose when subjected to the strains frequently encountered in practice.

The present invention overcomes the disadvantages referred to, and others, in a simple, efficient and economical manner.

Speaking generally, the invention embodies a shaft having a plurality of integral curvilinear portions, one of which is eccentric, and another of which is concentric, to the axis of rotation of the shaft, in combination with a hub, the bore of which is provided with portions corresponding to, and complementary with, the eccentric and concentric portions of the shaft. When the hub is positioned on the shaft, with the eccentric portion of the shaft extending into the corresponding eccentric portion of the hub, the concentric portions of the hub and shaft being in cooperative relation, all relative rotary movement of the hub and shaft is precluded.

It will be noted that this result is accomplished without resorting to any expedients or members independent of the shaft or hub; in other words, the hub is secured to the shaft without the use of disjunctive devices. This results in a simple and eminently practical structure, and, manifestly, one adapted to withstand far greater strains than could be borne by those dependent upon feather and slot connections, wedges, or equivalent expedients.

Features and advantages of the invention, other than those described, as well as the various adaptations of the principle of the invention, will be clear from the following description, taken in conjunction with the accompanying drawings.

In the accompanying drawings I have illustrated different practical embodiments of the invention, but the construction shown therein are to be understood as illustrative, only, and not as defining the limits of the invention.

Figures 1, and 3, are diametric sections of shafts and their cooperating hubs.

Figures 2, and 4, are end views of the shafts shown in Figures 1, and 3, respectively.

As the invention is particularly adapted for use in fastening fly-wheels to engine shafts, its employment in this environment is shown in the drawing. The specific modified forms illustrated will now be considered in succession, and their structures and modes of operation clearly defined.

In Figures 1 and 2, I have illustrated the preferred, practical embodiment of the invention, wherein the hub A of a fly-wheel is shown as mounted intermediate the ends of a shaft B.

It is common, structural practice in this art to form that portion of a shaft on which a hub is mounted, of slightly larger diameter than the remaining portion of the shaft. This is for the reason that it is desired to have the shaft fit the bore of the hub snugly. If the entire shaft were made of the same diameter, it would be necessary, in positioning a tight-fitting hub at any particular point thereon, to force the hub from one end of the shaft, by means of considerable pressure, to the position which it is intended to assume. Besides being a laborious task, such procedure necessitates the machining of substantially the entire length of the shaft, and, accordingly, as stated, the part to which the hub is to be applied is generally made slightly larger in diameter than the rest of the shaft, so that the hub may be run loosely along the shaft to its intended position and there forced into place. Accordingly, while the invention is not restricted to a shaft embodying this characteristic, the drawings, in practically every instance, show the hub portion of the shaft of slightly greater diameter than the remainder thereof.

In the exemplification of the invention shown in Figures 1 and 2, the hub portion of the shaft is shown as embodying three cylindrical portions $c$, $e$ and $c'$, formed integral with the shaft. Cylindrical portions $c$ and $c'$ are both made concentric or coaxial with shaft B, whereas the intermediate integral portion e is made eccentric to the axis of shaft B. The diameters of the respective portions are such that portion c is of the greatest diameter, portion e next smaller in diameter, and portion c' of the smallest diameter. The bore of hub A is formed to correspond to the configuration of portions c, e and c' of the shaft, so that, when the shaft is positioned within said bore, both the concentric and eccentric portions of the shaft will be in engagement with the corresponding portions of the hub bore. The fact that portions c, e and c' of the shaft successively diminish in size, allows of the sliding of hub A, in the direction of the arrow a, into the position shown in Figure 1.

The structure shown in Figures 3 and 4 is substantially the same in all essential particulars as that shown in Figures 1 and 2, hub A' being secured on shaft B' by concentric portions c c' and an intermediate eccentric portion e, the difference in the showing in the two latter figures being that hub A' is positioned at the end of shaft B', whereas, in Figures 1 and 2, hub A is positioned intermediate the ends of shaft B.

In the preferred embodiment of the invention shown in Figure 1, the forces so coact that the torque of the shaft is transmitted centrally to the hub of the wheel, and the hub, figuratively speaking, is balanced, inasmuch as the thrust on one end of the hub is the same as the thrust on the other end, while the thrust of eccentric e at the center of the hub balances the two thrusts at either end. In other words, concentric portions c c' preserve the coaxial relation between the hub and the shaft at both sides of the hub, and, when said portions are fitted tightly in the hub, they serve to transmit a rotary movement thereto, the intermediate eccentric portion e serving to positively rotate the hub.

Since the invention as shown is particularly adapted for use with a solid integral hub, rather than a split hub, it is desirable, in every instance, to obtain the greatest rigidity possible, and accordingly, wherever possible, it is desirable to employ the integral structure. Moreover, particularly in the securing of fly-wheels to engine shafts where the torque on the shaft is not constant, but is of a varying or pulsating nature, the strain upon the connection between the shaft and the fly-wheel is very great, and in such environment there should be no lost motion between the parts. Accordingly, it is desirable, when the invention is employed in this environment, and for that matter any environment, to so form the cooperating shaft portions and the bore of the hub that the corresponding parts will fit tightly and that they be forced into engagement with one another when positioning the hub upon the shaft. When this course is followed, there is absolutely no lost motion between the parts, with the result that, when the hub is in position as described, no amount of strain or wear and tear will cause the parts to work loose. This result can thus be obtained in an integral structure, and, accordingly, it is preferred to employ the solid wheel and hub over the split wheel, whenever possible.

It has been found by experience that the solid hub structure is far superior to any feather and slot, wedge or equivalent connection, such as has heretofore been employed. It may be stated, in passing, that the feather and slot connections, such as are commonly used, are known to possess the marked disadvantage of working loose during operation, and, if the feather is not tightened immediately, the parts will begin to work together and pound, with the result that the feather will either become entirely disengaged, or will be rounded or broken up. It is obvious that this disadvantage, so prevalent in prior art structures, cannot obtain in a structure formed in accordance with this invention.

It will be understood that, while, in the foregoing description, particular stress is laid upon hub A and A', as being a portion of a fly-wheel, this invention is not restricted to such environment, as the hub shown might be the hub of any wheel, such as a pulley for line-shafting, or the hub of a lever adapted to be rocked or rotated by a shaft, a railroad car wheel, etc.

From the foregoing consideration of the structural features of this invention and their mode of operation, it is obvious that, while the structure is extremely simple, its use is conducive to a high degree of efficiency, in that it effectually eliminates the drawbacks so commonly prevalent in the art to which it relates. The fact that the eccentric and concentric portions of the shaft are integral with one another and cooperate with corresponding portions of a hub, which portions are integral with each other, effectually precludes the working loose of the parts after they have been initially assembled. Moreover, such integral formation does not complicate the structure or increase its cost of production, but on the contrary, lessens the cost of construction by eliminating excess surfaces which must necessarily be very carefully machined, and reduces the number of parts to a minimum. The boring or machining of the hub to produce the cooperating concentric and eccentric portions is a simple, mechanical operation, as is also the formation of the concentric and eccentric portions on the shaft. The parts may thus be manufactured with very little excess cost over that of the various structures now in use, and, at the same time, a much more efficient and practical device results.

While I have illustrated and described one embodiment of my invention as contemplating the employment of two elements, one concentric and the other eccentric to the axis of the shaft, I do not intend to limit myself to this precise construction for it will be obvious that the same result will be accomplished where such elements and corresponding bores are eccentric each to the other. There may be a plurality of elements and corresponding bores, but it is essential that at least one of them should be eccentric to the axis of the shaft; the others may be concentric with the shaft or eccentric to the shaft and to the first mentioned eccentric element.

I have stated that I so form the corresponding parts of the hub and shaft that they will fit tightly when forced into engagement. I accomplish this result by making the shaft sections of a slightly greater diameter than the apertures which are provided to receive the same, so that when the shaft and hub are united under high pressure the metal is compelled to flow or permeate where the surfaces engage so that the shaft and hub become for all practical purposes homogeneous and integral, thus positively eleminating the element of friction between the parts when they are so united and forming a unitary structure in which the shaft and hub are integral.

Having thus fully described the invention, what I claim as new, and desire to secure by Letters Patent, is:

1. Means for securing hubs to shafts, embodying a hub of one piece integral construction provided with a shaft receiving bore, the portions of said bore adjacent the ends of the hub being concentric with the axis of oscillation of the hub, and the intermediate portion of said bore being eccentric to said axis, in combination with a single integral shaft extending uninterruptedly and unbrokenly through the hub and provided with correspondingly shaped and positioned portions, whereby the hub may be fitted on the shaft, with the complementary portions of the shaft and hub in direct engagement with one another.

2. Means for securing hubs to shafts, embodying a single integral shaft arranged to rock or rotate on its longitudinal axis, which shaft is provided with integral co-axial portions and an intermediate, integral eccentric portion, and a one piece integrally constructed hub embracing said shaft between the ends thereof, the bore of which hub is complementarily shaped to receive, in close fitting engagement, both the integral concentric and eccentric portions of the shaft.

3. Means for securing hubs to shafts, embodying a single integral shaft, which shaft is provided with integral coaxial portions and an intermediate eccentric portion all of which portions are cylindrical in form, and a one piece integrally constructed hub embracing said shaft between the ends thereof, the bore of which hub is complementarily shaped and adapted to receive, in close fitting engagement, both the integral concentric and eccentric portions of the shaft.

4. Means for securing hubs to shafts, embodying a hub of one piece integral construction provided with a shaft receiving opening having a cylindrical intermediate portion and adjacent cylindrical portions on either side thereof and eccentric thereto, and a single integral shaft fitted into the opening in the hub and shaped to conform with the different cylindrical portions thereof, said shaft extending uninterruptedly and unbrokenly through the opening of the hub.

5. A structure of the class described embodying a shaft provided with a plurality of integral portions, one of which is eccentric and others coaxial to the axis of the shaft, said portions being cylindrical in form and of successively diminishing sizes, the reduction in size being such that the entire periphery of each reduced portion lies within that of the adjacent larger portion in combination with a hub, the bore of which is shaped to conform to the coaxial and eccentric portions of the shaft and corresponding in dimensions to said portions, whereby the hub may be tightly fitted on the shaft, with the conforming portions of the hub and shaft in direct engagement with one another, by movement of the hub longitudinally of the shaft in one direction.

6. Means for securing hubs to shafts embodying a rigid one piece hub provided with a shaft receiving opening having a cylindrical intermediate portion and adjacent cylindrical portions on either side thereof and eccentric thereto, said cylindrical portions being of successively diminishing sizes, the reduction in size being such that the entire periphery of each reduced portion lies within that of the adjacent larger portion, and a single integral shaft fitted into the opening and extending uninterruptedly and unbrokenly through the hub, said shaft being provided with successively diminishing cylindrical portions of such diameters as to conform with the different cylindrical portions of the hub.

Signed by me at New York City, N. Y., this 4th day of March, 1916.

WYLIE GEMMEL WILSON.

Witnesses:
ANNA F. DAVIDSON,
MARGARET VOGEL.